US012582116B2

(12) United States Patent
Yu et al.

(10) Patent No.: US 12,582,116 B2
(45) Date of Patent: Mar. 24, 2026

(54) AGRICULTURAL FORMULATIONS

(71) Applicant: Dow Global Technologies LLC, Midland, MI (US)

(72) Inventors: Wanglin Yu, Pearland, TX (US); Yuri Alencar Marques, Lake Jackson, TX (US); Laura Havens, Fort Collins, CO (US); Sara B. Klamo, Chicago, IL (US)

(73) Assignee: Dow Global Technologies LLC, Midland, MI (US)

( * ) Notice: Subject to any disclaimer, the term of this patent is extended or adjusted under 35 U.S.C. 154(b) by 618 days.

(21) Appl. No.: 17/796,778

(22) PCT Filed: Mar. 1, 2021

(86) PCT No.: PCT/US2021/020222
§ 371 (c)(1),
(2) Date: Aug. 1, 2022

(87) PCT Pub. No.: WO2021/211218
PCT Pub. Date: Oct. 21, 2021

(65) Prior Publication Data

US 2023/0069185 A1 Mar. 2, 2023

Related U.S. Application Data

(60) Provisional application No. 63/011,372, filed on Apr. 17, 2020.

(51) Int. Cl.

| | |
|---|---|
| ***A01N 25/04*** | (2006.01) |
| ***A01N 37/10*** | (2006.01) |
| ***A01N 43/08*** | (2006.01) |
| ***A01N 43/40*** | (2006.01) |
| ***A01N 43/653*** | (2006.01) |

(52) U.S. Cl.
CPC ............. *A01N 25/04* (2013.01); *A01N 37/10* (2013.01); *A01N 43/08* (2013.01); *A01N 43/40* (2013.01); *A01N 43/653* (2013.01)

(58) Field of Classification Search
None
See application file for complete search history.

(56) References Cited

U.S. PATENT DOCUMENTS

| | | | |
|---|---|---|---|
| 6,048,892 | A | 4/2000 | Iwasaki et al. |
| 6,998,132 | B1 | 2/2006 | Ueda et al. |
| 8,710,250 | B2 | 4/2014 | Mikochik et al. |
| 9,102,644 | B2 | 8/2015 | Mikochik et al. |
| 9,108,940 | B2 | 8/2015 | Mikochik et al. |
| 9,637,463 | B2 | 5/2017 | Masuno et al. |
| 9,718,798 | B2 | 8/2017 | Browning et al. |
| 9,783,517 | B2 | 10/2017 | Cahana et al. |
| 2013/0217579 | A1 | 8/2013 | Wacker et al. |
| 2015/0047251 | A1 | 2/2015 | Mikochik et al. |

FOREIGN PATENT DOCUMENTS

| | | | | |
|---|---|---|---|---|
| CN | 104872114 A | 9/2015 | | |
| EP | 300691 A2 | 1/1989 | | |
| EP | 1838689 A2 | 10/2007 | | |
| WO | 03037084 A1 | 5/2003 | | |
| WO | 2006087523 A1 | 8/2006 | | |
| WO | 2009049840 A1 | 4/2009 | | |
| WO | 2014046982 A1 | 3/2014 | | |
| WO | 2014062303 A2 | 4/2014 | | |
| WO | WO-2019118704 A1 * | 6/2019 | ............... | C11D 3/50 |
| WO | 2019143893 A1 | 7/2019 | | |

OTHER PUBLICATIONS

Anonymous, "Cleaning & Processing Solvents—xF Technologies Inc.", Cleaning and Processing Solvents, 2018, pp. 1-3.
Reisch, "Solvent Users Look to Replace NMP—N-Methylpyrrolidone enabled environmentally friendlier products, but now it has toxicity problems", Chemical Engineering News, 2008, pp. 1-3.
PCT/US2021/020222, International Search Report and Written Opinion with a mailing date of Jun. 14, 2021.

* cited by examiner

*Primary Examiner* — David J Blanchard
*Assistant Examiner* — Kaeleigh E Olsen
(74) *Attorney, Agent, or Firm* — Arthur R. Rogers

(57) ABSTRACT

Embodiments of the present invention relate to formulations that can be used in the agriculture industry. In one aspect, an agricultural formulation comprises at least one agricultural active ingredient in an amount from 1 weight percent up to 80 weight percent based on the total weight of the formulation, and an alkyl furan ester solvent of Formula 1, wherein the formulation comprises from 5 weight percent up to 80 weight percent of the alkyl furan ester solvent.

14 Claims, No Drawings

AGRICULTURAL FORMULATIONS

FIELD

The present invention relates to formulations that can be used in the agriculture industry.

INTRODUCTION

Organic solvents are widely utilized in the agriculture industry in order to achieve a suitable delivery system for water insoluble active ingredients such as pesticides and fertilizer stabilizers. Solvents that afford more concentrated solutions of a number of pesticidally active ingredients are desired to develop economical formulations. For example, solubilizing 20 weight percent or more of an active ingredient is typically desirable. Moreover, of particular interest in the agriculture industry are solvents with high polarity and low water solubility which enable the formulation of an emulsifiable concentrate. In general, an emulsifiable concentrate is a concentrated solution of a pesticide in an organic solvent that may further contain suitable surfactants, including emulsifiers, so that when mixed with a relatively large volume of water, it will generate a stable oil-in-water emulsion for application (e.g., by spraying), to a target site. In addition to high solubilization power and low water solubility, solvents with a sustainable profile that combines renewable carbon content with low ecological and human toxicity are increasingly preferred to minimize environmental impact of agricultural products and health concerns.

It would be desirable to have alternative solvents that can provide high solubility for agricultural active ingredients, such as pesticides and fertilizers, with an attractive sustainability profile (e.g., without, or at least with diminished, health and environmental concerns).

SUMMARY

The present invention provides agricultural formulations that provide high solubility for agricultural active ingredients and low water solubility. Such formulations, in some embodiments, have an attractive sustainability profile such as being from a renewable origin and low toxicity.

In one aspect, an agricultural formulation comprises at least one agricultural active ingredient in an amount from 1 weight percent up to 80 weight percent based on the total weight of the formulation; and an alkyl furan ester solvent according to Formula 1:

(Formula 1)

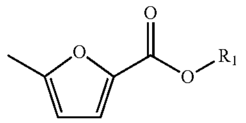

wherein $R_1$ is a methyl group, an ethyl group, or a linear or branched alkyl group having 3 to 12 carbon atoms, and wherein the formulation comprises from 5 weight percent up to 80 weight percent of the alkyl furan ester solvent. In some embodiments, the formulation is in the form of an emulsifiable concentrate.

These and other embodiments are described in more detail in the Detailed Description.

DETAILED DESCRIPTION

As used herein, "a," "an," "the," "at least one," and "one or more" are used interchangeably.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include one or more additional compounds unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or", unless stated otherwise, refers to the listed members individually as well as in any combination. Use of the singular includes use of the plural and vice versa.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

Unless stated to the contrary, implicit from the context, or customary in the art, all parts and percents are based on weight and all test methods are current as of the filing date of this disclosure.

When a compound (e.g., an active ingredient) is characterized as being soluble in a solvent (e.g., "compound soluble in N,N-dialkyl fatty amide," "compound soluble in an aromatic ketone," "compound soluble in an alkyl ketone," "compound soluble in a cyclic ketone," "compound soluble in an aromatic hydrocarbon solvent," etc.), such term means that a compound is soluble in the specified solvent under ambient conditions, i.e., 23° C. and atmospheric pressure. In this context, solubility is defined by the approximate volume of solvent in milliliters (mL) needed to dissolve 1 gram (g) of solute. Table 1 provides a summary of common solubility descriptions.

TABLE 1

| Description | Volume of solvent (mL) Needed to Dissolve 1 g of Solute |
|---|---|
| Very Soluble | Less than 1 |
| Freely Soluble | 1 to 10 |
| Soluble | 10 to 30 |
| Sparingly Soluble | 30 to 100 |
| Slightly Soluble | 100 to 1000 |
| Very Slightly Soluble | 1000 to 10,000 |
| Practically Insoluble | Greater than 10,000 |

Methods for measurement of compound (e.g., active ingredient) solubility involve dissolving the solid solute in a solvent using agitation or shaking under specified temperature and time conditions. The saturated solution is then separated from the solid using filtration. The concentration of the solute in the saturated solution is determined by analysis using ultraviolet (UV) spectroscopy, high pressure liquid chromatography with evaporative light scattering, UV, or mass spectrometry detection or NMR spectroscopy.

"Aromatic hydrocarbon", "arene", "aryl hydrocarbon" and like terms mean a hydrocarbon with sigma bonds and delocalized pi electrons between carbon atoms forming monocyclic or polycyclic rings. Examples include, but are not limited to, benzene, toluene, naphthalene and the like.

"Hydrocarbon" and like terms mean a compound consisting only of carbon and hydrogen atoms.

"Solution" and like terms mean a homogeneous composition that is (1) variable, i.e., can exist in different concentrations of solute in solvent, (2) all but one component is present in simplest units, e.g., molecules, and (3) can be separated by physical methods into two or more pure substances. In the context of this invention, solution refers to liquid compositions.

"Composition" and like terms mean a mixture or blend of two or more components.

"Emulsion" and like terms mean a mixture of two or more liquids that are normally immiscible (unmixable or unblendable) with one another, i.e., the liquids do not form a solution.

"Emulsifiable concentrate" and like terms mean a formulation in which the concentrate is typically diluted in water to form a stable emulsion. "Stable" and like terms mean that the emulsion will exhibit little, if any, deterioration over 24 hours under ambient conditions, e.g., 23° C. and atmospheric pressure.

"Free of an aromatic hydrocarbon solvent" and like terms mean, in the context of the compositions of this invention, that the composition contains less than (<) 5, or <4, or <3, or <2, or <1, or <0.5, or <0.1, or <0.05, or <0.01, wt % of an aromatic hydrocarbon that can solubilize under ambient conditions (23° C. and atmospheric pressure) an aromatic hydrocarbon soluble compound such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of aromatic hydrocarbon in the composition is typically present as a contaminant and is without any significant effect on the formation, maintenance and intended use of the composition. In one embodiment "free of an aromatic hydrocarbon solvent" means that the composition does not contain any amount of such solvent as measured by conventional gas chromatography (GC) or high pressure liquid chromatography (HPLC).

"Free of an N,N-dialkyl fatty amide solvent" and like terms mean, in the context of the compositions of this invention, that the composition contains less than (<) 5, or <4, or <3, or <2, or <1, or <0.5, or <0.1, or <0.05, or <0.01, wt % of N,N-dialkyl fatty amide that can solubilize under ambient conditions (23° C. and atmospheric pressure) compounds such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of N,N-dialkyl fatty amide in the composition is typically present as a contaminant and is without any significant effect on the formation, maintenance and intended use of the composition. In one embodiment "free of an N,N-dialkyl fatty amide solvent" means that the composition does not contain any amount of such solvent as measured by conventional gas chromatography (GC) or high pressure liquid chromatography (HPLC).

"Free of an aromatic, alkyl, and cyclic ketone solvents" and like terms mean, in the context of the compositions of this invention, that the composition contains less than (<) 5, or <4, or <3, or <2, or <1, or <0.5, or <0.1, or <0.05, or <0.01, wt % of aromatic, alkyl, and cyclic ketone solvents that can solubilize under ambient conditions (23° C. and atmospheric pressure) compounds such as pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. Any such amount of aromatic, alkyl, and cyclic ketone solvent in the composition is typically present as a contaminant and is without any significant effect on the formation, maintenance and intended use of the composition. In one embodiment "free of aromatic, alkyl, and cyclic ketone solvents" means that the composition does not contain any amount of such solvent as measured by conventional gas chromatography (GC) or high pressure liquid chromatography (HPLC).

Embodiments of the present invention generally relate to agricultural formulations that include at least one agricultural active ingredient and an alkyl furan ester solvent according to Formula 1 as further described herein. In some embodiments, such formulations can be emulsifiable concentrates. For example, the formulation can include agricultural active ingredients such as pesticides, fertilizer stabilizers, and/or others. In one embodiment, an agricultural formulation of the present invention comprises at least one agricultural active ingredient in an amount from 1 weight percent up to 80 weight percent based on the total weight of the formulation, and an alkyl furan ester solvent according to Formula 1:

(Formula 1)

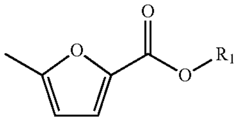

wherein $R_1$ is a methyl group, an ethyl group, or a linear or branched alkyl group having 3 to 12 carbon atoms, and wherein the formulation comprises from 5 weight percent up to 80 weight percent of the alkyl furan ester solvent. In some embodiments, $R_1$ is an ethyl group. In some embodiments, the agricultural formulation is in the form of an emulsifiable concentrate.

In some embodiments, the agricultural formulation comprises less than 50 weight percent of a co-solvent. The co-solvent, in such embodiments, comprises at least one of an N,N-dialkyl fatty amide solvent, an aromatic hydrocarbon solvent, an aliphatic hydrocarbon solvent, an aromatic, alkyl, cyclic ketone solvent, a glycol ether solvent, a seed oil solvent, or a fatty acid ester solvent, or a combination thereof.

In some embodiments, the agricultural active ingredient is soluble in at least one of N,N-dialkyl fatty amide, an aromatic ketone, an alkyl ketone, a cyclic ketone, or an aromatic hydrocarbon solvent. In some such embodiments, the agricultural formulation contains less than 50 weight percent of an aromatic hydrocarbon solvent. In some such embodiments, the agricultural formulation is free of an aromatic hydrocarbon solvent.

In some embodiments, the agricultural active ingredient is soluble in at least one of N,N-dialkyl fatty amide, an aromatic ketone, an alkyl ketone, a cyclic ketone, or an aromatic hydrocarbon solvent. In some such embodiments, the agricultural formulation contains less than 50 weight percent of an N,N-dialkyl fatty amide solvent. In some such embodiments, the agricultural formulation is free of an N,N-dialkyl fatty amide solvent.

In some embodiments, the agricultural active ingredient is soluble in at least one of N,N-dialkyl fatty amide, an aromatic ketone, an alkyl ketone, a cyclic ketone, or an aromatic hydrocarbon solvent. In some such embodiments, the agricultural formulation contains less than 50 weight percent of aromatic, alkyl, and cyclic ketone solvents. In some such embodiments, the agricultural formulation is free of aromatic, alkyl, and cyclic ketone solvents.

In some embodiments, the agricultural active ingredient is at least one of a pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine.

In some embodiments, the agricultural active ingredient is at least one of a bifenthrin, tebuconazole, 2-methyl-4-chlorophenoxyacetic acid, 2,4-dichlorophenoxyacetic acid, N-(n-butyl)thiophosphoric triamide, dicamba acid, and nitrapyrin.

Agricultural formulations of the present invention, in some embodiments, further comprise one or more of a surfactant, emulsifier, dispersant, humectant, adjuvant, antioxidant, rheology modifier, antifreeze, or colorant, wherein the one or more of a surfactant, emulsifier, dispersant, humectant, adjuvant, antioxidant, rheology modifier, antifreeze, or colorant comprises from greater than zero to less than or equal to 15 weight percent of the composition.

Alkyl Furan Ester Solvent

Agricultural formulations of the present invention comprise an alkyl furan ester solvent according to Formula 1:

(Formula 1)

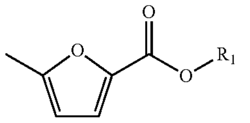

wherein $R_1$ is a methyl group, an ethyl group, or a linear or branched alkyl group having 3 to 12 carbon atoms. In some embodiments, $R_1$ is an ethyl group. In some embodiments, the alkyl furan ester solvent is methyl 2-furoate, ethyl 2-furoate, isopropyl 2-furoate.

In one embodiment, the alkyl furan ester solvent is methyl 2-furoate. An example of a methyl 2-furoate that can be used in some embodiments of the present invention is Methyl 408, commercially available from xF Technologies Inc.

In one embodiment, the alkyl furan ester solvent is ethyl 2-furoate. An example of an ethyl 2-furoate that can be used in some embodiments of the present invention is Ethyl 408, commercially available from xF Technologies Inc.

In one embodiment, the alkyl furan ester solvent is isopropyl 2-furoate. An example of an isopropyl 2-furoate that can be used in some embodiments of the present invention is Isopropyl 408, commercially available from xF Technologies Inc.

In some embodiments, the alkyl furan ester solvent is the only solvent used in the agricultural formulation.

In some embodiments, an agricultural formulation comprises from 5 weight percent up to 80 weight percent of the alkyl furan ester solvent, based on the total weight of the formulation. In some embodiments, the alkyl furan ester solvent of Formula 1 comprises greater than or equal to (≥) 5, ≥20, ≥30, ≥40, ≥50, ≥60, ≥70, or ≥75 weight percent (wt %) of the agricultural formulation, based on the total weight of the formulation. In some embodiments, the alkyl furan ester solvent of Formula 1 comprises less than or equal to ≤80, ≤75, ≤70, ≤60, ≤50, ≤40, ≤30, or ≤20 of the agricultural formulation, based on the total weight of the formulation.

In some embodiments, the agricultural formulation can provide a higher concentration of the agricultural active ingredient. In some such embodiments, the above-described alkyl furan ester solvent of Formula 1 comprises greater than or equal to (≥) 10, ≥20, ≥30, ≥40, or ≥45 weight percent (wt %) of the agricultural formulation. In some embodiments, the alkyl furan ester solvent of Formula 1 comprises less than or equal to (≤) 50, ≤45, ≤40, ≤35, or ≤30 wt % of the agricultural formulation.

The alkyl furan ester solvent of Formula 1 described herein can, in some embodiments, also reduce or eliminate the use of solvents with undesirable physical, human, and/or environmental hazards in some applications.

Agricultural Active Ingredient

In addition to the alkyl furan ester solvent of Formula 1, agricultural formulations of the present invention further comprise an agricultural active ingredient.

In some embodiments, the agricultural active ingredient is soluble in at least one of the following solvents: N,N-dialkyl fatty amide solvent, an aromatic hydrocarbon solvent, an aliphatic hydrocarbon solvent, an aromatic, alkyl, cyclic ketone solvent, a glycol ether solvent, a seed oil solvent, or a fatty acid ester solvent, or a combination thereof. As used herein, "an alkyl ketone" is defined according to Formula 2:

(Formula 2)

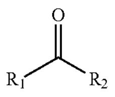

wherein $R_1$ and $R_2$ are independently linear or branched alkyl groups that are comprised of only carbon and hydrogen atoms. According to the definition of Formula 2, the only functional group in an alkyl ketone is the ketone carbonyl group and the only heteroatom in the alkyl ketone is the carbonyl oxygen atom.

The solubility of the compound in one or more of these solvents is important as the alkyl furan ester solvent of Formula 1 herein can serve as a desirable alternative to such solvents. Typically, the agricultural active ingredients are compounds used for one or more agricultural functions, e.g., pesticides, insecticides, herbicides, fungicides, fertilizer additives, etc. These agricultural active ingredients are typically water insoluble and include, but are not limited to, pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine. In some embodiments, the compound that is soluble in N,N-dialkyl fatty amide solvent, an aromatic hydrocarbon solvent, an aliphatic hydrocarbon solvent, an aromatic, alkyl, cyclic ketone solvent, a glycol ether solvent, a seed oil solvent, or a fatty acid ester solvent, or a combination thereof, is at least one of bifenthrin, tebuconazole, 2-methyl-4-chlorophenoxyacetic acid, 2,4-dichlorophenoxyacetic acid, N-(n-butyl)thiophosphoric triamide, dicamba acid, and nitrapyrin. Specific fertilizer additives include, but are not limited to, N-(n-butyl)thiophosphoric triamide and nitrapyrin.

The amount of agricultural active ingredient to be used in embodiments of agricultural formulations of the present invention can depend on a number of factors including, without limitation, the particular active ingredient used, whether the formulation includes multiple active ingredients, whether the formulation is an emulsifiable concentrate, the intended use of the formulation, and other factors known to those of ordinary skill in the art based on the teachings herein. In some embodiments, the agricultural formulation comprises from 1 weight percent up to 80 weight percent of the agricultural active ingredient, based on the total weight of the formulation.

In some embodiments, the agricultural formulations comprise greater than (>) 5, or greater than or equal to (≥) 10, or ≥15, weight percent (wt %) of the agricultural active ingredient, based on the total weight of the formulation. In some embodiments, the agricultural formulations comprises less than or equal to (≤) 20 wt % of the agricultural active ingredient, based on the total weight of the formulation.

In some embodiments, the agricultural formulations can provide a higher concentration of the agricultural active ingredient. In some such embodiments, the agricultural formulations comprises greater than (>) 20, or greater than or equal to (≥) 25, ≥30, ≥35, ≥40, or ≥45 weight percent (wt %) of the agricultural active ingredient, based on the total weight of the formulation. In some embodiments, the agricultural formulations comprises less than or equal to (≤) 50 wt % of the agricultural active ingredient, based on the total weight of the formulation.

Additional Solvents

As noted above, in some embodiments, an alkyl furan ester solvent of Formula 1 is the only solvent used in agricultural formations of the present invention. However, in some embodiments, agricultural formulations of the present invention further comprise a co-solvent (in addition to the alkyl furan ester solvent of Formula 1). When present, the co-solvent comprises less than 50 weight percent of the agricultural formulation based on the total weight of the formulation.

In some embodiments, the co-solvent comprises at least one of an N,N-dialkyl fatty amide solvent, an aromatic hydrocarbon solvent, an aliphatic hydrocarbon solvent, an aromatic, alkyl, cyclic ketone solvent, a glycol ether solvent, a seed oil solvent, or a fatty acid ester solvent, or a combination thereof.

In some embodiments, the agricultural formulations of the present invention contain less than (<) 50, or less than or equal to (≤) 40, or ≤30, or ≤20, or ≤10, or ≤5 wt % of an N,N-dialkyl fatty amide solvent, based on the total weight of the formulation. In one embodiment, an agricultural formulation of the present invention is free of an N,N-dialkyl fatty amide solvent.

In some embodiments, the agricultural formulations of the present invention contain less than (<) 50, or less than or equal to (≤) 40, or ≤30, or ≤20, or ≤10, or ≤5 wt % of aromatic hydrocarbon solvents, based on the total weight of the formulation. In one embodiment, an agricultural formulation of the present invention is free of aromatic hydrocarbon solvents.

In some embodiments, the agricultural formulations of the present invention contain less than (<) 50, or less than or equal to (≤) 40, or ≤30, or ≤20, or ≤10, or ≤5 wt % of aromatic ketone solvents, based on the total weight of the formulation. In one embodiment, an agricultural formulation of the present invention is free of aromatic ketone solvents.

In some embodiments, the agricultural formulations of the present invention contain less than (<) 50, or less than or equal to (≤) 40, or ≤30, or ≤20, or ≤10, or ≤5 wt % of alkyl ketone solvents, based on the total weight of the formulation. In one embodiment, an agricultural formulation of the present invention is free of alkyl ketone solvents.

In some embodiments, the agricultural formulations of the present invention contain less than (<) 50, or less than or equal to (≤) 40, or ≤30, or ≤20, or ≤10, or ≤5 wt % of cyclic ketone solvents, based on the total weight of the formulation. In one embodiment, an agricultural formulation of the present invention is free of cyclic ketone solvents.

In some embodiments, the agricultural formulations of the present invention contain less than (<) 50, or less than or equal to (≤) 40, or ≤30, or ≤20, or ≤10, or ≤5 wt % of aromatic, alkyl, and cyclic ketone solvents, based on the total weight of the formulation. In one embodiment, an agricultural formulation of the present invention is free of aromatic, alkyl, and cyclic ketone solvents.

In some embodiments, the total amount of N,N-dialkyl fatty amide solvents, aromatic ketone solvents, alkyl ketone solvents, cyclic ketone solvents, and aromatic hydrocarbon solvents in an agricultural formulation of the present invention is less than (<) 50, or less than or equal to (≤) 40, or ≤30, or ≤20, or ≤10, or ≤5 wt %. In one embodiment, an agricultural formulation of the present invention is free of N,N-dialkyl fatty amide solvents, aromatic ketone solvents, alkyl ketone solvents, cyclic ketone solvents, and aromatic hydrocarbon solvents.

Potential Additives

In some embodiments, agricultural formulations of the present invention can comprise components in addition to agricultural active ingredients, alkyl furan ester solvents according to Formula 1, and potential co-solvents. In some embodiments, agricultural formulations of the present invention further comprise one or more of a surfactant, emulsifier, dispersant, humectant, adjuvant, antioxidant, rheology modifier, antifreeze, or colorant.

Surfactants useful in the invention can be anionic, nonionic or cationic in character and can function as wetting agents, suspending agents, anti-foaming and defoaming agents, along with other functions. Blends of anionic and nonionic surfactants are commonly utilized. Surfactants conventionally used in agricultural formulations are described in *Encyclopedia of Surfactants*, Vol. I-III, Chemical Publishing Co., New York, 1980-81 and in *McCutcheon's Detergents and Emulsifiers Annual*, MC Publishing Corp., Ridgewood, New Jersey, 1998. Typical surfactants include, but are not limited to, alkylphenol-alkylene oxide addition products, such as nonylphenol-C18 ethoxylate, alcohol-alkylene oxide addition products, such as tridecyl alcohol-C16 ethoxylate, quaternary amines, such as lauryl trimethyl ammonium chloride, salts of mono and dialkyl phosphate esters, and solid or liquid organosilicones. Examples of useful organosilicone surfactants include commercially available polysiloxane/polyether copolymers such as TEGOSTAB B-8462, B-8404 and B-8871, available from Evonik AG, and VORASURF™ DC-198 and DC-5043 surfactants, available from The Dow Chemical Company, and NIAX™ L-627 surfactants from Momentive Performance Materials.

Representative emulsifiers include, but are not limited to, anionic emulsifiers such as alkaline earth, alkali metal, and amine salts of dodecyl benzene sulfonic acid, alkylarylsulfonic acids, and alkylnapthalenesulfonic acids, sodium dialkyl sulfosuccinate, sodium diisoctylsulfosuccinate, and amine salts of ether sulfates. Nonionic emulsifiers include fatty acid alkanolamides, condensation products of fatty alcohols, fatty amines, fatty acid esters, and fatty acid amides with ethylene oxide and/or propylene oxide, condensation products of linear or branched primary alcohols with ethylene oxide and/or propylene oxide, condensation products of linear or branched secondary alcohols with ethylene oxide and/or propylene oxide, fatty esters of polyhydric alcohol esters such as sorbitan fatty acid esters, condensation products of fatty esters of polyhydric alcohol esters with ethylene oxide such as polyoxyethylene sorbitan fatty acid esters, ethoxylated lanolin alcohols, ethoxylated lanolin acids. Cationic emulsifiers include aliphatic mono-, di-, or polyamine acetates and oleates. Combination anionic and nonionic emulsifier products available as preblended products include, for example, TENSIOFIX B.7416, B.7438, and B.7453 and ATLOX™ 4851B and ATLOX™ 4855B.

Representative dispersants include, but are not limited to, nonionic surfactants and wetting agents such as those prepared by the sequential addition of propylene oxide and then ethylene oxide to propylene glycol, block copolymers of ethylene oxide and propylene oxide, and condensation products of linear alcohols with ethylene oxide and propylene oxide, such as butanol ethylene oxide or propylene oxide copolymer.

Representative humectants include, but are not limited to, propylene glycol, glycerol, and polyethylene glycol.

Representative adjuvants include, but are not limited to, spreaders, petroleum and plant derived oils and solvents, wetting agents. Adjuvants useful in emulsifiable concentrate compositions are described in *Compendium of Herbicide Adjuvants,* 9th Edition, edited by Bryan Young, Dept. of Plant, Soil, and Agricultural Systems, Southern Illinois University, MC-4415, 1205 Lincoln Dr., Carbondale, IL 62901. Examples of adjuvants include, but are not limited to, alkyl polysaccharides and blends, amine ethoxylates, polyethylene glycol esters, ethoxylated alkyl aryl phosphate esters, paraffin oil, horticultural spray oils, methylated rape seed oil, methylated soybean oil, refined vegetable oil, 2-ethyl hexyl stearate, n-butyl oleate, propylene glycol dioleate, isopropyl myristate, and ethylene vinyl acetate terpolymers.

Persons of ordinary skill in the art can identify potential antioxidants, rheology modifiers, antifreezes, or colorants that can be used in some embodiments of agricultural formulations based on the teachings herein.

The total amount of additives in the inventive agricultural formulations, if present, comprises greater than (>) 0, or greater than or equal to (≥) 0.5, or ≥1, or ≥1.5 weight percent (wt %) of the formulation, based on the total weight of the formulation. Typically the total amount of additives in the agricultural formulation comprises less than or equal to (≤) 15, or ≤10, or ≤5, or ≤3 wt % of the formulation, based on the total weight of the formulation. In one embodiment the total amount of additives in the agricultural formulation comprises from >0 to ≤15, or from ≥0.5 to ≤10, or from ≥1 to ≤5, wt % of the formulation, based on the total weight of the formulation.

Preparation of Agricultural Formulations

Agricultural formulations of the present invention can be prepared using techniques known to those of ordinary skill in the art based on the teachings herein.

In some embodiments, agricultural formulations of the present invention can be prepared as emulsifiable concentrates. Such emulsifiable concentrates can be prepared in vessels or tanks having agitators for mixing or high shear mixing. All equipment and piping utilized is typically dry and free from moisture or residues of water. Nitrogen may be used to flush air from the process system prior to generation of the emulsifiable concentrate product. Formulation components, including agricultural active ingredients, fertilizer additives, solvents, surfactants, emulsifiers, dispersants, humectants, adjuvants, antioxidants or colorants are added to the process vessel sequentially, as single components or in groups, with agitation. The components of the emulsifiable concentrate may be added in liquid, solid, or molten forms. The composition is mixed at controlled temperature, typically of 25 to 30° C., for 1 to 2 hours or until a homogeneous solution is obtained. In some cases elevated temperatures are utilized to form the homogeneous solution, for example between 30 and 80° C. In some cases, the emulsifiable concentrate solution may be filtered using a GAF or similar filter.

Some embodiments of the invention will now be described in detail in the following Examples.

EXAMPLES

The following examples are given to illustrate the invention and should not be construed as limiting its scope. All parts and percentages are by weight unless otherwise indicated.

An example of an ethyl furan ester solvent Formula 1 that can be used in embodiments of agricultural formulations of the present invention is ethyl 2-furoate ("Formula 1 Solvent A"). In the following examples, the Formula 1 Solvent A used is Ethyl 408, which is an ethyl 2-furoate commercially available from xF Technologies Inc.

Example 1

The solubility of Formula 1 Solvent A in water is measured to be 0.67 weight percent. The solubility of water in Formula 1 Solvent A is measured to be 1.44 weight percent.

The water solubility of another Formula 1 solvent, 5-methyl-2-furoate, is also measured, and has a solubility in water of 0.67 weight percent.

Example 2

In this example, the solubilities of various agricultural active ingredients in Formula 1 Solvent A are compared to their solubilities in an aromatic hydrocarbon solvent. The aromatic hydrocarbon solvent used is Aromatic 150 from Exxon Mobil Corporation ("Aromatic Hydrocarbon"). The agricultural active ingredients used are bifenthrin, tebuconazole, nitrapyrin, and dicamba acid.

The solubilities are determined by visual observation using the following method. Four milliliter vials are charged with agricultural active ingredient (10 to 50 wt %) and the specified solvent (90 to 50 wt %). The vials are capped and taped to seal with electric tape. The vials are secured in a plastic container and shaken on a laboratory shaker for 12 hours at ambient laboratory temperature and humidity. After 12 hours, each sample set is evaluated for solubility of the agricultural active ingredient solid. Complete solubilization of the agricultural active ingredient is determined to be achieved if a homogeneous clear solution is observed. The formulations made with Formula 1 Solvent A represent some embodiments of agricultural formulations of the present invention. The results are shown in Table 2:

TABLE 2

| | Agricultural Active Ingredient Solubility (wt %) | | | |
|---|---|---|---|---|
| Solvent | Bifenthrin | Tebuconazole | Nitrapyrin | Dicamba Acid |
| Formula 1 Solvent A | 30 | 20 | >50 | 40 |
| Aromatic Hydrocarbon | 40 | <10 | — | <10 |

The results demonstrate that ethyl 2-furoate provides superior solubility of tebuconazole and dicamba acid as compared to the aromatic hydrocarbon solvent. In addition, ethyl 2-furoate presents a superior environmentally friendly profile relative to Aromatic 150 (as ethyl 2-furoate is based on renewable raw materials) for the preparation of agricultural formulations.

Example 3

In this example, the solubilities of various agricultural active ingredients in Formula 1 Solvent A are compared to their solubilities in a N,N-dialkyl fatty amide solvent. The N,N-dialkyl fatty amide solvent used is HALLCOMID™ M-10', which is a N,N-dimethyldecanamide from Stepan Company ("N,N-dialkyl Fatty Amide"). The agricultural active ingredients used are bifenthrin, tebuconazole, nitrapyrin, and dicamba acid.

The solubilities are determined by visual observation using the following method. Four milliliter vials are charged with agricultural active ingredient (10 to 50 wt %) and the specified solvent (90 to 50 wt %). The vials are capped and taped to seal with electric tape. The vials are secured in a plastic container and shaken on a laboratory shaker for 12 hours at ambient laboratory temperature and humidity. After 12 hours, each sample set is evaluated for solubility of the agricultural active ingredient solid. Complete solubilization of the agricultural active ingredient is determined to be achieved if a homogeneous clear solution is observed. The formulations made with Formula 1 Solvent A represent some embodiments of agricultural formulations of the present invention. The results are shown in Table 3:

TABLE 3

| | Agricultural Active Ingredient Solubility (wt %) | | | |
|---|---|---|---|---|
| Solvent | Bifenthrin | Tebuconazole | Nitrapyrin | Dicamba Acid |
| Formula 1 Solvent A | 30 | 20 | >50 | 40 |
| ,N-dialkyl Fatty Amide | 30 | 30 | — | <10 |

The results demonstrate that ethyl 2-furoate provides superior solubility of dicamba acid as compared to the N,N-dialkyl fatty amide solvent. Furthermore, ethyl 2-furoate provides comparable solubility of bifenthrin along with better toxicological properties.

We claim:

1. An agricultural formulation comprising:

at least one agricultural active ingredient in an amount from 1 weight percent up to 80 weight percent based on the total weight of the formulation, and an alkyl furan ester solvent according to Formula 1:

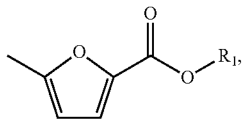

wherein $R_1$ is a methyl group, an ethyl group, or a linear or branched alkyl group having 3 to 12 carbon atoms, and wherein the formulation comprises from 5 weight percent up to 80 weight percent of the alkyl furan ester solvent based on the total weight of the formulation.

2. The agricultural formulation of claim 1, further comprising less than 50 weight percent of a co-solvent based on the total weight of the formulation.

3. The agricultural formulation of claim 2, wherein the co-solvent comprises at least one of an N,N-dialkyl fatty amide solvent, an aromatic hydrocarbon solvent, an aliphatic hydrocarbon solvent, an aromatic, alkyl, or cyclic ketone solvent, a glycol ether solvent, a seed oil solvent, and a fatty acid ester solvent.

4. The agricultural formulation of claim 1, further comprising less than 50 weight percent of an aromatic hydrocarbon solvent based on the total weight of the formulation.

5. The agricultural formulation of claim 1, wherein the agricultural formulation is free of an aromatic hydrocarbon solvent.

6. The agricultural formulation of claim 1, further comprising less than 50 weight percent of an N,N-dialkyl fatty amide solvent based on the total weight of the formulation.

7. The agricultural formulation of claim 1, wherein the agricultural formulation is free of an N,N-dialkyl fatty amide solvent.

8. The agricultural formulation of claim 1, further comprising less than 50 weight percent of aromatic, alkyl, and cyclic ketone solvents based on the total weight of the formulation.

9. The agricultural formulation of claim 1, wherein the agricultural formulation is free of aromatic, alkyl, and cyclic ketone solvents.

10. The agricultural formulation of claim 1, wherein the at least one agricultural active ingredient is at least one of a pyrethroid, organophosphate, organosulfite, carbamate, cyclohexanedione, isoxazole, phenoxy, chlorophenoxyacetic, anilide, chloroacetanilide, chloromethoxy benzoic, oxyacetanilide, strobilurin, triazole, triazapentadiene, synthetic auxin, aryloxyphenoxy propionate, benzofuran, pyrimidine, phenylpyrazole, phenylurea, diphenyl ether, hydroxybenzonitrile, thiophosphoric triamide, and chloropyridine.

11. The agricultural formulation of claim 1, wherein the at least one agricultural active ingredient is at least one of a bifenthrin, tebuconazole, 2-methyl-4-chlorophenoxyacetic acid, 2,4-dichlorophenoxyacetic acid, N-(n-butyl)thiophosphoric triamide, dicamba acid, and nitrapyrin.

12. The agricultural formulation of claim 1, further comprising one or more of a surfactant, emulsifier, dispersant, humectant, adjuvant, antioxidant, rheology modifier, antifreeze, or colorant in an amount from greater than zero to less than or equal to 15 weight percent based on the total weight of the formulation.

13. The agricultural formulation of claim 1, wherein $R_1$ in Formula 1 is an ethyl group.

14. The agricultural formulation of claim 1, wherein the formulation is in the form of an emulsifiable concentrate.

* * * * *